Patented July 4, 1944

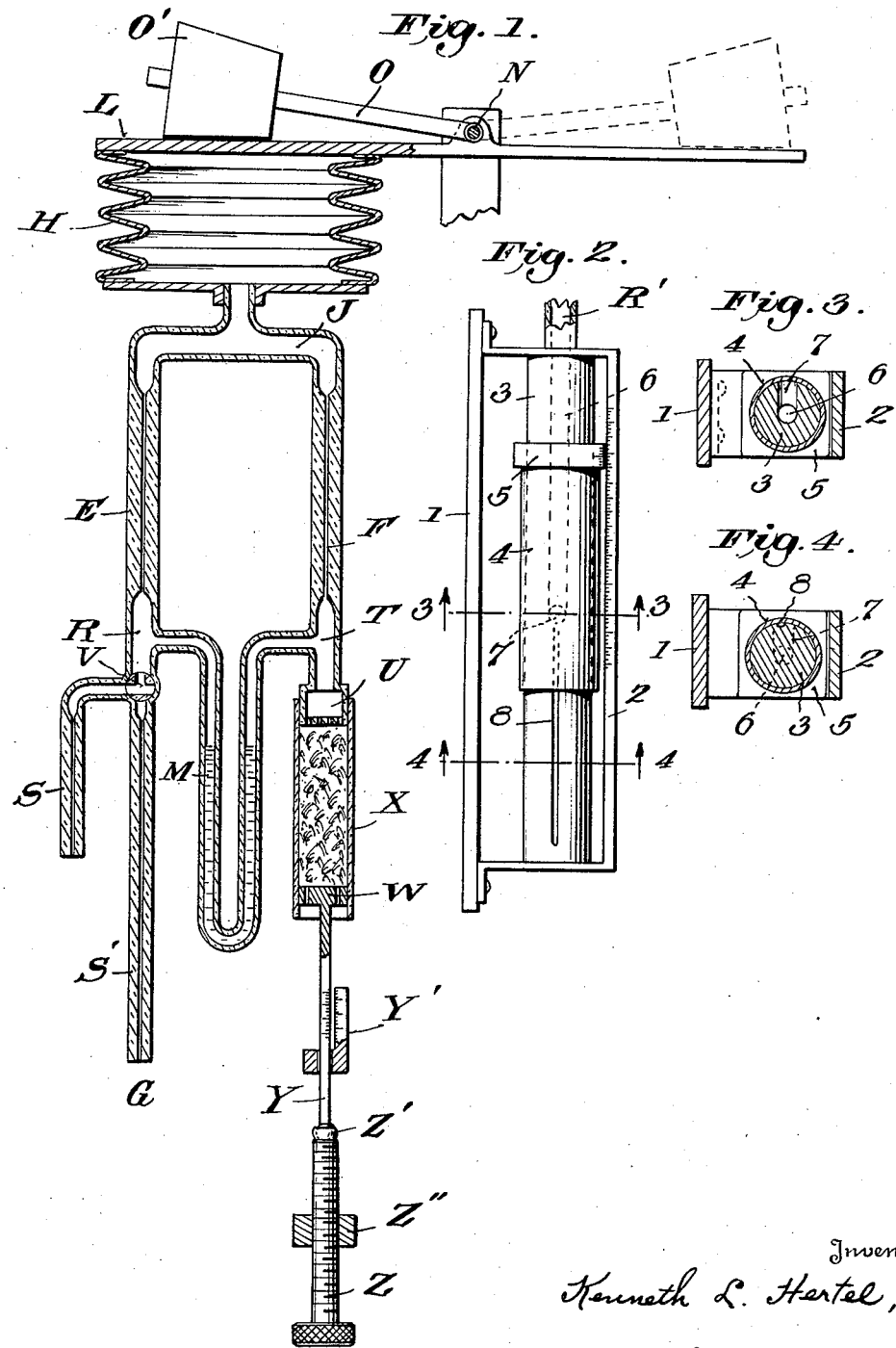

2,352,835

UNITED STATES PATENT OFFICE 2,352,835

APPARATUS FOR AND METHOD OF DETERMINING PHYSICAL PROPERTIES OF POROUS MATERIAL

Kenneth L. Hertel, Knoxville, Tenn., assignor to University of Tennessee Research Corporation, Knoxville, Tenn., a corporation of Tennessee Application September 13, 1939, Serial No. 294,727

10 Claims. (Cl. 73—51)

This invention relates to a method of and apparatus for measuring the resistance to fluid flow offered by porous material, and more particularly masses of finely divided material, in order that other factors related to this resistance may be determined.

Specifically, one factor which it is possible to determine by means of the present invention is the total surface per gram of the finely divided material, whether this be compressible fibrous material such as cotton, wool, etc., or incompressible granular material such as sand, cement, grain, etc.

In the case of compressible material, another factor which it is possible to determine by means of the invention is the density of the substance constituting the material.

When applied to fibrous materials such as raw cotton, for example, the invention provides a means for comparing the relative fineness of the fibers, as the term "fineness" is popularly understood. This characteristic is corelated to the factor which it is possible to really measure, namely the total surface area of the fibers per gram of material, and thus by determining the total surface area per gram of different samples of cotton, a general idea of the relative fineness of the fibers may be obtained.

So far as the apparatus is concerned, the general object of the invention is to provide apparatus which is extremely simple in construction and which operates on the balanced or differential principle, so that the actual fluid pressure employed and the actual quantity of fluid passing through the apparatus is immaterial.

A more specific object is to provide apparatus operating on the principle of the "Wheatstone bridge," in that it provides a fluid conduit system having four arms constituting two pair, and having means whereby the relative fluid pressures existing at the junction points between the two adjacent arms forming each pair may be indicated.

The apparatus comprises capillary tubes which interpose a known resistance to the flow of fluid therethrough, and a still further object of the invention is to devise a capillary tube arrangement of this nature, in which the length of the tube, and consequently the amount of resistance produced, can be adjusted or varied as desired.

In order that the invention may be readily understood, reference is had to the accompanying drawing forming part of this specification, and in which:

Fig. 1 is a general view showing the apparatus in longitudinal section, parts being illustrated in elevation;

Fig. 2 is a side elevation of one form of adjustable capillary tube which I have devised; and Figs. 3 and 4 are transverse sections on the lines 3—3 and 4—4, respectively, of Fig. 2.

Referring to the drawing in detail, my improved apparatus comprises a fluid conduit structure arranged in the form of a "bridge," having two pairs of arms E, S, and F, X. The free end of one arm of each pair is open to atmosphere as at G, while the other ends of one arm of each pair are connected together as at J, and the common junction connected to a source of fluid pressure illustrated conventionally as a bellows H.

This bellows is secured at its upper end to a platform L pivoted to a fixed support at N. Also pivoted to this support at N is an arm O having at its end a weight O'. This weighted arm can be turned about the pivot N from full line position to dotted line position as shown in Fig. 1. When in full line position, it tends to compress the bellows and to force air under pressure down through the conduit J to the bridge structure above referred to. If, on the other hand, the weighted arm is thrown over to the dotted line position, it tends to expand the bellows, thus creating a partial vacuum and drawing air up from G through the arms of the bridge.

The conduits forming the arms E, F and S of the bridge contain restrictions, which, as shown, consist of capillary tubes, which offer a known or determinable resistance to the flow of air. As illustrated in the drawing, two tubes S and S' of different length are shown, branching from a common point, and a rotary plug valve V is provided for operatively connecting either one or the other of these arms as desired.

The fourth arm of the bridge offers an unknown resistance to the flow of fluid such as air, and contains the sample of material to be tested. As shown, it comprises a cylindrical container into the opposite ends of which are fitted perforated pistons U and W, the former communicating with the conduit structure constituting the bridge and the latter communicating with atmosphere.

The arrangement illustrated in the drawing is for the purpose of measuring the fluid flow resistance of a mass of compressible fibrous material, such as raw cotton. This is contained within the cylinder, and is confined between the pistons U and W. The piston W is provided with a rod or stem Y passing through a fixed guide and swiveled at Z' to the end of an adjusting screw Z working through a fixed support Z″. Thus the extent to which the sample of material in the cylinder X is compressed may be varied by turning the screw Z. A suitable scale, preferably including a Vernier, may be employed at Y′ to enable the extent of movement of the piston W to be accurately read.

Connected across the junction point R of the arms E and S, and the junction point T of the arms F and X of the bridge, is a pressure-responsive device, sealed against fluid flow, shown as a manometer tube M, containing a suitable liquid. If the pressure at R and T are equal, then of course the liquid will stand at the same level in the two legs of the monometer, while any difference in pressure will be indicated by a difference in the level of the liquid.

When a difference in fluid pressure is applied to the two ends J and G of the conduit system, as by means of the bellows H, fluid tends to flow through the arms of each pair in series and through the two pairs of arms in parallel. Obviously the same quantity of fluid will flow through the arms E and S, and the same quantity will flow through the arms F and X. If the drop in fluid pressure from the point J to the intermediate point R, at the junction between the arms E and S, is equal to the drop in fluid pressure from the point J to the other intermediate point T at the junction between the arms F and X, then the pressure at R and T will be the same, and the system is balanced.

This balancing occurs when the resistance of E bears the same proportion to the resistance of S, as the resistance of F bears to the resistance of X. If E and F are, as shown, equal, then, when the system is balanced, the resistance of X is equal to the resistance of S.

In order to secure this balance, in which X and S are of equal resistance, the mass of material in X is compressed by means of the screw Z until equality is obtained, as indicated by the liquid in the manometer M.

Thus by virtue of the balanced system as above described, the exact pressure generated by the bellows H is immaterial, and it is even immaterial whether or not this pressure remains absolutely constant during the taking of a test. It will, of course, be understood, that in operation, the degree of compression is small, the resistance is relatively high, and the amount of fluid flowing through the apparatus per second is relatively small as compared with the capacity of the bellows.

It may be explained that there are two distinct, well recognized types of fluid flow, namely "laminar" flow and "turbulent" flow. The former takes place through pipes or tubes, in which the fluid elements flow along fixed streamlines which are parallel to the walls of the tubular channel. The latter is the type which usually occurs when fluid flows through a simple orifice. The laws governing these two types of flow are fundamentally different, the flow through tubes, such as the capillary tubes herein described, being directly proportional to the pressure difference at their ends, while the flow through orifices is, as is well known, proportional to the square root of the pressure difference at the opposite sides thereof.

It has been found that the flow through porous media or masses is in the nature of a "viscous" flow, and as stated by Darcy's law, is directly proportional to the pressure difference. Thus, the flow through porous masses follows substantially the same law and is generally similar to the flow through capillary tubes.

Hence, in making comparative determinations of the relation between a standard fluid conduit offering a known resistance to fluid flow, and a mass of porous material offering an unknown resistance, it is desirable to employ as standards conduits which produce the same general type of flow as that which takes place through the porous masses, namely, a "laminar" flow, and, as above pointed out, capillary tubes produce this type of flow. It is only in this way that accurate comparisons between the known and unknown resistances can be successfully made.

When the above described balance is obtained, it is possible to express the resistance of the unknown arm X in terms of the resistance of E, F, and S.

If $p$ is the pressure drop across the ends of a capillary tube of length $l$, having a radius $r$, and a cross-sectional area A, Q the volume of fluid flowing per second, and $\mu$ the viscosity of the fluid, Poiseuille's equation states that:

$$p = Q \frac{l}{A} \cdot \frac{8\mu}{r^2} \qquad (1)$$

It has also been shown that if $p$ is the pressure drop across a porous mass of finely divided material, of uniform cross-section A, throughout its length $l$, $a$ the total surface area per cc. of the actual substance of the material exposed to the fluid, and $f$ is the fraction of the total space which is occupied by the material itself (such total space being taken up by both the material and the voids between the particles thereof), then:

$$p = Q \frac{l}{A} \cdot \frac{9\mu}{2k} \cdot \frac{a^2 f^2}{(1-f)^3} \qquad (2)$$

where $k$ is some constant, approximately unity.

As above pointed out, it is obvious that the quantity of fluid flowing through E and S is the same, and the quantity flowing through F and X is the same. The first will be designated $Q_1$ and the second $Q_2$.

Employing these designations, and using the subscripts 1, 2, 3 and 4 to indicate the factors corresponding to the arms E, F, S and X, respectively; and also assuming that the pressure drop across E and F is the same, and consequently that the drop across S and X is the same, Equation 1 above, can, under balanced conditions, be applied as follows:

$$p_1 = Q_1 \frac{l_1}{A_1} \cdot \frac{8}{r_1^2} = Q_2 \frac{l_2}{A_2} \cdot \frac{8}{r_2^2} \qquad (3)$$

where $p_1$ is the pressure drop across E and F.

The ratio $$\frac{Q_2}{Q_1}$$

can be obtained from the above Equation 3, thus:

$$\frac{Q_2}{Q_1} = \frac{\frac{l_1}{A_1 r_1^2}}{\frac{l_2}{A_2 r_2^2}}$$

This ratio depends upon the dimensions of the particular apparatus being used, and is therefore a constant, which may be designated K.

Similarly, Equation 2 may be applied as follows:

$$p_2 = Q_1 \frac{l_3}{A_3} \cdot \frac{8}{r_3^2} = Q_2 \frac{l_4}{A_4} \cdot \frac{9}{2k} \cdot \frac{a^2 f^2}{(1-f)^3} \qquad (4)$$

where $p_2$ is the pressure drop across S and X.

Obtaining the ratio $$\frac{Q_2}{Q_1}$$

also from the above Equation 4, the two right hand members of Equation 4 can be written (cancelling out common terms):

$$\frac{Q_2}{Q_1}=\frac{\frac{l_3^8}{A_3r_3^2}}{\frac{l_4}{A_4}\cdot\frac{9}{2k}\cdot\frac{a^2f^2}{(1-f)^3}}=K \quad (5)$$

The two right hand members of this expression form an equation from which $p$, $Q$ and $\mu$ have been eliminated, thus showing that the result is true, regardless of the value of these factors.

From this:

$$Ka^2=\frac{l_3^8}{A_3r_3^2}\cdot\frac{A_42k(1-f)^3}{l_49f^2}=\frac{16A_4l_3k(1-f)^3}{9A_3r_3^2l_4f^2}$$

The above equation can be simplified to read:

$$Ka_2=\frac{C(1-f)^3}{l_4f^2} \quad (6)$$

where $$C=\frac{16A_4l_3k}{9A_3r_3^2}$$

In this expression, it will be remembered that $l_3$ is the length of the capillary tube S, $A_3$ is its cross-sectional area, and $r_3$ its inside radius. $A_4$ is the cross-sectional area of the cylindrical mass of material being tested at X. Hence, all of these quantities are constant for a given standard resistance tube and particular piece of apparatus.

However, Equation 6 cannot be solved in terms of known quantities, because it contains two unknowns, namely $a$ and $f$. It is therefore necessary to develop a second equation involving these terms.

This can be done by securing another set of data, to obtain a new values of C. To accomplish this, I provide a second standard capillary tube, designated S' in Fig. 1, controlled by the valve V. By turning this valve clockwise 90° from the position shown in the drawing, the tube S will be cut off, and the tube S' connected to the arm E of the "bridge." Having connected the tube S', as described, the porous body of fibrous material in the cylinder at X is compressed by means of the screw Z until a condition of balance, as indicated by the manometer, is again obtained.

The compression of the material produces a new value of $f$, which may be called $f'$, and a new value of $l_4$, which may be called $l'_4$, and although $A_4$ remains the same, the use of the different tube S' gives rise to a new value for C, which may be designated C'.

On the basis of Equation 6, therefore, a new equation can now be written, thus:

$$Ka^2=\frac{C(1-f)^3}{l_4f^2}=\frac{C'(1-f')^3}{l'_4f'^2} \quad (7)$$

Let $m$ designate the total mass or weight of the sample being tested, and $d$ designate the density of the actual substance of the material. Then, since $f$ is the fraction of the total space, $A_4l_4$ which is occupied by the actual substance of the material.

$$f=\frac{m}{dA_4l_4} \quad (8)$$

and $$f'=\frac{m}{dA_4l'_4} \quad (9)$$

Substituting these values of $f$ and $f'$ in the two right hand members of Equation 7, (omitting the left hand member), it will be obvious that it is possible to solve this equation for $d$, in terms of the two standard resistance tubes (embodied in the constants C and C'), the cross-sectional area and mass of the sample, (both of which remain constant for any given experiment) and the lengths $l_4$ and $l'_4$ of the sample. All of these quantities are known or can be measured.

It will thus be seen that my novel process and apparatus makes it possible to achieve the remarkable result of measuring the density of the actual substance of a body of fibrous or other finely divided material by a purely hydrodynamical method.

With the value of $d$ determined by the above method, this value of $d$ can be substituted in Equation 8, and the value of $f$ thus becomes known. Hence, every quantity on the right hand side of Equation 6 is known, and since K is the constant of the instrument and can be measured, $a$ can be determined from this equation. As already explained, $a$ is the total surface per cc. of actual substance of the fibers making up the porous body of material, and this factor has a definite relation to the popular concept of "fineness."

It follows that the total surface per gram of material is $a/d$, where $d$ is the density, as before.

The foregoing discussion is based on the assumption that the material being tested in compressible, such for example as fibrous material. For materials that are not compressible, such for example as sand or other granular materials, it is not possible to compress them sufficiently to obtain widely different readings. This for the reason that the length $l_4$ of the sample cannot be varied substantially so as to be used as in Equation 7. Thus it is not practicable to determine the density of such non-compressible materials by the hydro-dynamical method described. Moreover, such a method is not particularly important for granular materials, since the density of such materials can readily be determined by other methods, such for example as the usual immersion method. If the density of the porous body of granular material is known, and the necessary data relating to its resistance to fluid flow obtained by means of the above described apparatus, the factor $a$, corresponding to the surface per unit volume, can readily be calculated from Equation 6, above.

In the case of fibrous material such as cotton, wool and the like, the sample is compressed, as already described until its resistance is such as to produce a balance with the other arms of the apparatus. For non-compressible substances, it is necessary to vary the resistance of one of the other arms of the "bridge," such for example as the arm S. For this purpose I propose, instead of the fixed capillary tubes S or S', to employ a capillary tube of adjustable length. One embodiment of such a variable tube is illustrated in Figs. 2, 3, and 4.

Referring to these figures, the device comprises a suitable base 1, to which is secured a bracket 2, in which is mounted a bar or cylinder 3 extending the full length of the bracket. On the surface of this cylinder is formed a very small restricted groove 8, which may be either spiral or straight as shown in Fig. 2. This groove extends only along part of the length of the cylinder 3 and communicates at its end with a radial port 7 formed in the cylinder 3, which port communicates with an axial passage 6 extending through the cylinder from the port 7 to the upper end of the cylinder, which is provided with a tubular connection R' adapted to be secured to the conduit structure shown in Fig. 1 at the point R, just above the valve V. In other words, the device shown in Fig. 2 is substituted for the tubes S and S' and valve V.

Fitting closely over the cylinder 3 is a sleeve 4, preferably having an annular flange 5 at one end. The bracket 2 and flange 5 are provided with suitable cooperating scales (preferably vernier) by which the exact position of the sleeve 4 on the cylinder 3 may be read.

From the foregoing it will be understood that if the sleeve 4 is in a position adjacent the lower end of the cylinder 3, it will cover substantially all of the groove 8, and, therefore, the length of this capillary groove will be a maximum, and its resistance to fluid flow will be the greatest. If, however, the sleeve is moved upwardly into some such intermediate position as that illustrated in Fig. 2, it will uncover a portion of the groove, and the remaining portion which is still covered will be relatively short and the resistance which it offers, relatively small. Thus by moving the sleeve up and down, the resistance of the restriction in this arm of the "bridge" can be varied as desired.

In using the apparatus for determining the surface per unit volume or per unit mass of granular material, a sample cup or container of known length and cross-section would be completely filled with the material, and its weight would be measured. By adjusting the variable arm of the bridge, just described, until its resistance is such that the apparatus is balanced, it is possible, by measuring the effective length of the capillary groove 8, and knowing the weight and length of the sample, to calculate the surface per unit volume or per unit mass, in accordance with Equation 6.

While, in regard to fibrous material, I refer in the specification and claims to the density of the substance of the individual fibres it will be understood that, in the case of fibres, which like cotton, contain an enclosed cavity or cell, I mean the density of the substance of the fibres including such cell.

What I claim is:

1. Apparatus for determining the relative resistance to fluid flow offered by porous material comprising a plurality of fluid conduits connected to form the four arms of a bridge, each offering a substantial resistance to fluid flow and one being constructed to contain the porous material, means for causing fluid to flow simultaneously through both sides of said bridge, means for adjusting the resistance to fluid flow offered by one arm of the bridge other than that containing the porous material, until a condition of balance is obtained, and means for indicating the degree of said adjustment.

2. Apparatus for determining the relative resistance to fluid flow offered by porous material comprising a plurality of fluid conduits connected to form the arms of a bridge, all offering substantial resistance to fluid flow, one of said arms being constructed to contain the porous material, and another of said arms comprising a capillary tube having means by which its length may be adjusted as desired, whereby its resistance to fluid flow may be varied, and fluid pressure responsive means connected across the mid points of said bridge.

3. Apparatus for determining the resistance offered by porous material to fluid flow comprising a plurality of fluid conduits arranged in the form of a bridge, one of said conduits being constructed to contain the porous material whose resistance is to be determined, and the remaining conduits each embodying a capillary tube, and all of said conduits offering a substantial resistance to fluid flow, the conduits at one end of the bridge communicating with a common body of fluid, and those at the opposite end communicating with another common body of fluid, means for maintaining said bodies of fluid at different pressures, and differential pressure indicating means connected across intermediate points of said bridge.

4. Apparatus for determining the resistance offered by porous material to fluid flow comprising a plurality of fluid conduits arranged to form the arms of a bridge, one of said conduits containing the porous material to be tested and the conduit of the corresponding arm comprising a capillary tube, each of said conduits offering substantial resistance to fluid flow, means for causing fluid from the same source to flow simultaneously through said conduits constituting both sides of the bridge, means for varying the resistance offered by that arm of the bridge comprising said capillary tube to produce a balanced condition, and means for indicating when such balanced condition is obtained.

5. Apparatus for measuring the resistance to fluid flow offered by porous material comprising conduits arranged to provide two paths of fluid flow from a common source, one path extending in series through two restrictions so that an intermediate pressure is established at a point between them, the other path extending in series through a third restriction and the sample of material to be tested, so that a second intermediate pressure is established at a point between said third restriction and said sample, means to adjust the resistance to fluid flow offered by one of said restrictions so as to equalize said intermediate pressures, and means for indicating when said pressures are equalized, said adjusting means being calibrated.

6. Apparatus for determining the resistance offered by a porous material to fluid flow comprising a plurality of fluid conduits arranged to form the arms of a bridge, the conduit constituting one arm containing the porous material to be tested, and the conduit of the corresponding arm of the bridge comprising two branches, each consisting of a capillary tube, and means for selectively connecting into operative relation either of said tubes, as desired, each of said conduits offering substantial resistance to fluid flow and the resistance offered by said two tubes being different, means for causing fluid from the same source to flow simultaneously through the conduits constituting both sides of the bridge, means for producing a balanced condition of the bridge when either tube is connected therein, and means for indicating when such balanced condition is obtained.

7. The method of determining the porosity of a porous article, which comprises causing a gaseous medium to flow in two distinct confined paths from a common source at an approximately uniform maintained pressure to a common discharge at a maintained lower pressure, the flow in one path being serially through two flow restrictors whereby a first intermediate pressure is established between said restrictors and the flow in the other path being serially through two restrictions, one of which is the article whose porosity is to be determined and the other of which is a third restrictor whereby a second intermediate pressure is established between the porous article and third restrictor; adjusting the flow capacity of one of said three restrictors until the first and second intermediate pressures are equal; and expressing porosity in terms of such adjustment.

8. Apparatus for determining the resistance offered by porous material to fluid flow comprising a plurality of fluid conduits arranged in the form of a bridge, one of said conduits being constructed to contain the porous material whose resistance is to be determined, and the remaining conduits each embodying a tube constructed to produce a laminar flow, and all of said conduits offering a substantial resistance to fluid flow, the conduits at one end of the bridge communicating with a common body of fluid, and those at the opposite end communicating with another common body of fluid, means for maintaining said bodies of fluid at different pressures, and pressure balance indicating means connected across intermediate points of said bridge.

9. Apparatus for determining the resistance offered by porous material to fluid flow comprising a plurality of fluid conduits arranged to form the arms of a bridge, one of said conduits containing the porous material to be tested and the conduit constituting another arm comprising a tube constructed to produce a laminar flow, each of said conduits offering substantial resistance to fluid flow, means for causing fluid from the same source to flow simultaneously through said conduits constituting both sides of the bridge, means for varying the resistance offered by that arm of the bridge comprising said tube to produce a balanced condition, and means for indicating when such balanced condition is obtained.

10. Apparatus for determining the relative resistance to fluid flow offered by porous material comprising a plurality of fluid conduits connected to form the arms of a bridge, all offering substantial resistance to fluid flow, one of said arms being constructed to contain the porous material, and another of said arms comprising a tube providing a restricted passage, means for adjusting the length of said restricted passage as desired, whereby its resistance to fluid flow may be varied, and fluid pressure responsive means connected across the mid points of said bridge.

KENNETH L. HERTEL.